United States Patent [19]
Denkowski et al.

[11] 3,838,609
[45] Oct. 1, 1974

[54] DE-CLUTCH MECHANISM IN VALVE OPERATOR

[75] Inventors: Walter J. Denkowski; John Zouzoulas, both of King of Prussia, Pa.

[73] Assignee: Philadelphia Gear Corporation, Montgomery Co., Pa.

[22] Filed: Aug. 24, 1973

[21] Appl. No.: 391,328

[52] U.S. Cl. ................. 74/625, 74/567, 192/114 R
[51] Int. Cl. ........................................... F16h 25/00
[58] Field of Search ............... 192/114 R, 93 A, 54; 74/625, 567

[56] References Cited
UNITED STATES PATENTS
3,168,841  2/1965  Caldwell et al. .................... 74/625
3,726,155  4/1973  Denkowski et al. .................. 74/625

*Primary Examiner*—Benjamin W. Wyche
*Attorney, Agent, or Firm*—Paul & Paul

[57] ABSTRACT

In a de-clutch mechanism for shifting automatically between a primary drive and a secondary drive and in which the secondary drive actuates a cam and shifter mechanism to shift a clutch fork to slide a spring-loaded slidable sleeve clutch from primary drive to secondary drive, a secondary clutch mechanism is provided between the shifter mechanism and the clutch fork for assuring that the clutch fork can be returned from secondary drive to primary drive even though the shifter mechanism happens to be in such position relative to the shifter cam that the cam tends to block return movement of the shifter mechanism.

7 Claims, 7 Drawing Figures

DE-CLUTCH MECHANISM IN VALVE OPERATOR

BACKGROUND OF THE INVENTION

The present invention relates to a de-clutch mechanism for coupling a rotatable power shaft selectively to either a primary drive or a secondary drive. The primary drive is usually a power drive while the second drive is ordinarily a manual handwheel drive.

The de-clutch mechanism includes a sleeve clutch splined to the power shaft and slidable therealong. The clutch sleeve is normally spring-biased to a position to couple the power drive to the power shaft. In the event of power failure, a manual drive is connectable automatically to the power shaft by merely turning a handwheel. Turning the handwheel is effective, by means of a cam and shifter mechanism, to shift the sleeve clutch axially along the splined power shaft into coupling engagement with the manual drive gear. Return to motor drive is effected automatically when the power is turned on. De-clutch mechanisms of the type referred to is shown in our U.S. Pat. No. 3,726,155, issued Apr. 10, 1973, and assigned to the assignee of the present application.

While de-clutch mechanisms of the type being described have other uses, the mechanisms are particularly suited for use in valve operators, which are actuating mechanisms employed to open and close large valves. Such valve actuating mechanisms usually include a nut which is fixed in a housing against axial movement and which when rotated moves a threaded spindle or stem in the axial direction of the stem, thereby to open or close a valve. The nut is usually driven by a worm gear driven by a worm. Rotation of the worm shaft may be effected by two selectively operable gear trains, one of which is power driven and the other of which is manually operated.

When used in connection with such valve operators, the de-clutch mechanism of the type being described is adapted, when the power is off and the handwheel is rotated, to shift the sleeve clutch in a direction to disconnect the power-drive gear train from the worm shaft and to connect automatically the handwheel drive gear train to the worm shaft. This is accomplished by the mere action of manually turning the handwheel. When the power is turned on, the de-clutch mechanism automatically shifts the sleeve clutch in the opposite direction to disconnect the handwheel drive and to connect the motor drive gear train to the worm shaft.

In some prior-art de-clutch mechanisms, when the power is off, if the handwheel happens to be manually rotated less than one full revolution to a particular position such that the flipper follower is opposite the shifter cam, the sleeve clutch will be decoupled from the power drive but not coupled to the handwheel drive, and if the sleeve clutch happens to be in this neutral position when the power comes on, the prior-art mechanisms referred to are not capable of shifting the sleeve clutch back into motor drive. This is not true, however, of the de-clutch mechanism shown in our aforementioned U.S. Pat. No. 3,726,155. In that patent, the de-clutch mechanism is so arranged that it is not possible to turn the handwheel to such position that, when the power comes on, the motor drive is incapable of pulling the sleeve clutch from neutral position into motor drive engagement.

SUMMARY OF THE INVENTION

The object of the present invention is to provide a simplified de-clutch mechanism of the type shown in our U.S. Pat. No. 3,726,155 having the highly desirable feature that it is not possible to turn the handwheel to such position that, when the power comes on, the motor drive is not capable of pulling the sleeve clutch from neutral position into motor drive engagement.

The foregoing object is accomplished, according to the present invention, by providing a simplified secondary clutch between the shifter mechanism and the sleeve-clutch fork to permit the fork to shift the sleeve clutch back into motor drive engagement even though the shifter mechanism may be prevented by the shifter cam from returning to its original position.

DETAILED DESCRIPTION OF THE PREFERRED EMBODIMENTS

Figure 1:
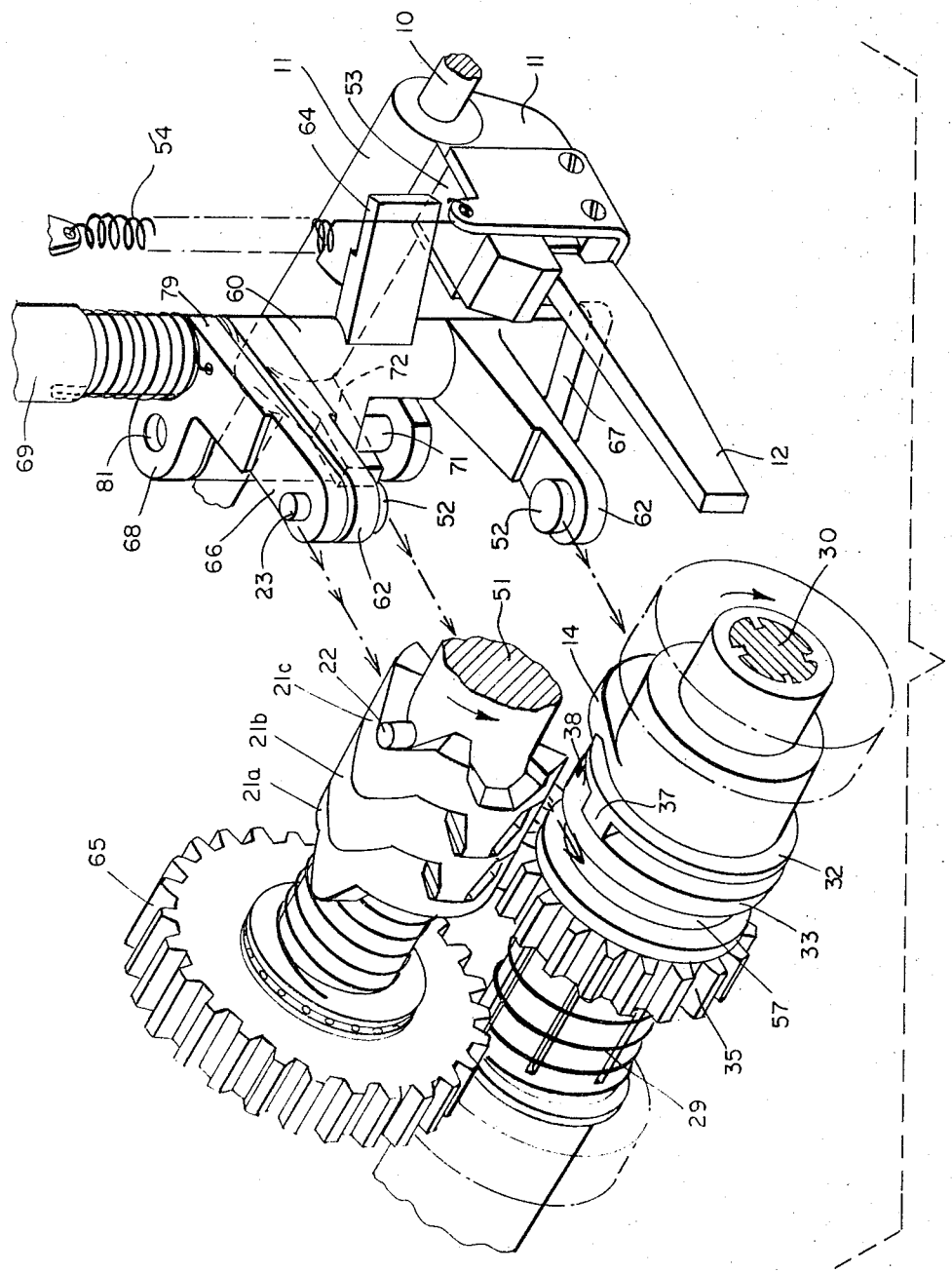
FIG. 1 is an exploded perspective view of the de-clutch mechanism according to the present invention.

Reference is first made to FIG. 1 where 30 is a motor drive shaft and 51 is the handwheel drive shaft. Keyed on motor drive shaft 30 is a clutch element 32 which is adapted by engagement of lugs 37 and 38 to drive a sliding clutch 33. A heavy spring 29 maintains sliding clutch 33 in engagement with clutch element 32.

Figure 2:
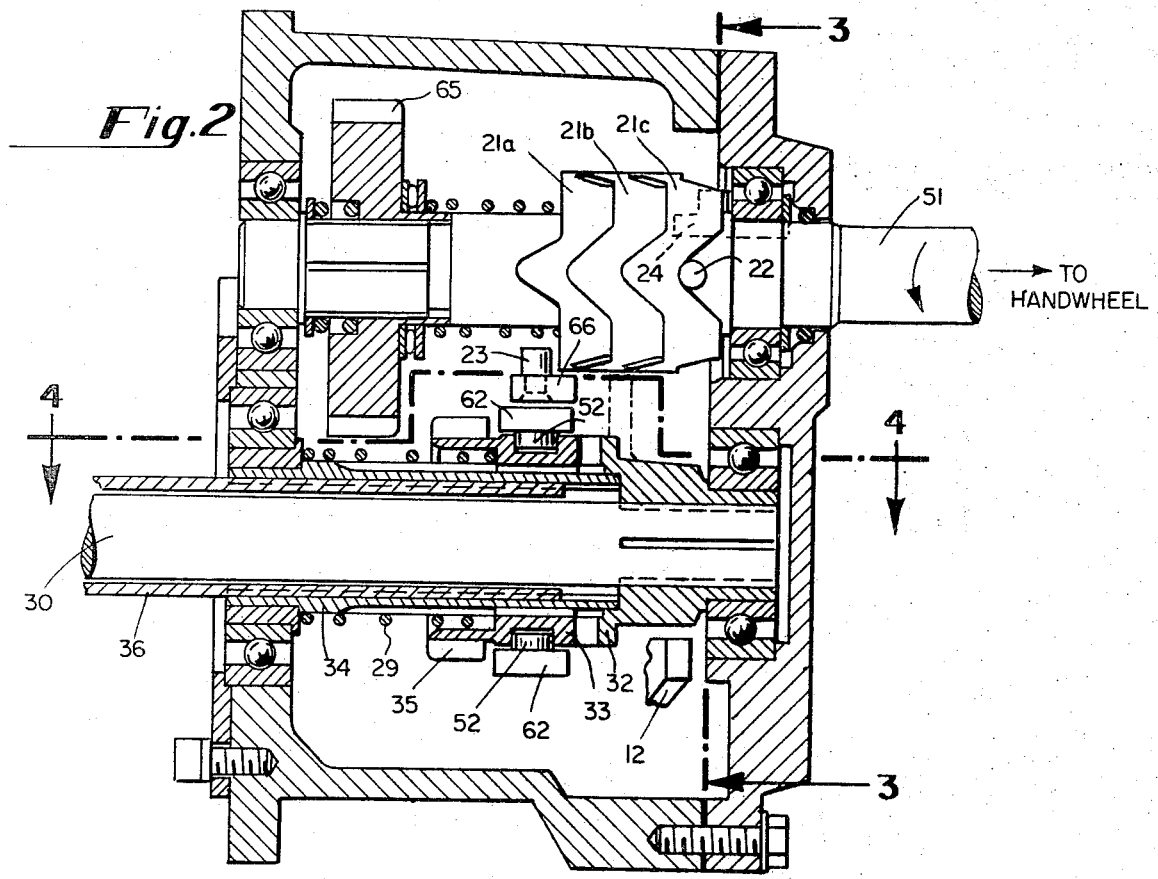
FIG. 2 is a side elevational view, largely in section.

As seen in section in FIG. 2, sliding clutch 33 is splined to a sleeve 34 which is splined to worm sleeve 36. The worm on shaft 36, which is not shown in the drawing, meshes with and drives a worm gear which is keyed to a valve stem, and in this way the valve stem is driven rotationally by the motor drive. Integral with sliding clutch 33 is a spur gear 35 which, if the sleeve clutch 33 be moved slidingly to the left (as viewed in FIGS. 1 and 2) against the action of the bias spring 29, will engage and mesh with spur gear 65 on the handwheel shaft 51. Thus, the handwheel drive may be traced from the handwheel drive shaft 51, through spur gear 65, spur gear 35 of the sliding clutch 33, sleeve 34 and worm sleeve 36.

OPERATION: SHIFT TO HANDWHEEL DRIVE

The operation of the new de-clutch mechanism of the present invention will now be described. During this description of operation, the elements provided by the invention which achieve the objects of the invention will, of course, be described.

Assume that the power is off and that the attendant has not yet manually rotated the handwheel. Gear 35 is in the springbiased position shown in FIGS. 1, 2 and 4, being out of mesh with gear 65 on the handwheel drive shaft 51. Assume now that the attendant starts to turn the handwheel shaft 51 in the counterclockwise direction indicated by the arrows in FIGS. 1, 2 and 7. When shaft 51 is so rotated, pin 22 drives the three nested nose cam elements 21a, 21b, and 21c rotationally, as a nested unit, for a fraction of one revolution. As soon as the forwardly projecting nose of the forward vertebrate cam element 21a comes into contact with cam follower roller 23, (FIGS. 1, 2 and 7), further rotation of the forward vertebrate cam element 21a ceases unit. However, pin 22 continues to move rotationally with the handwheel shaft 51, and, accordingly, pin 22 by a camming action forces the nest of vertebrate cam elements axially forwardly, thereby forcing the cam follower roller 23 forwardly in the direction of the arrow in FIG. 7. It will be understood that vertebrate cam elements 21a, 21b and 21c are annular elements which are mounted free on shaft 51. These elements have the shapes indicated in the drawings. While three such vertebrate cam elements are shown, it should be understood that so far as the invention is concerned, the number of vertebrate cam elements could be greater or less than three.

Figure 6:
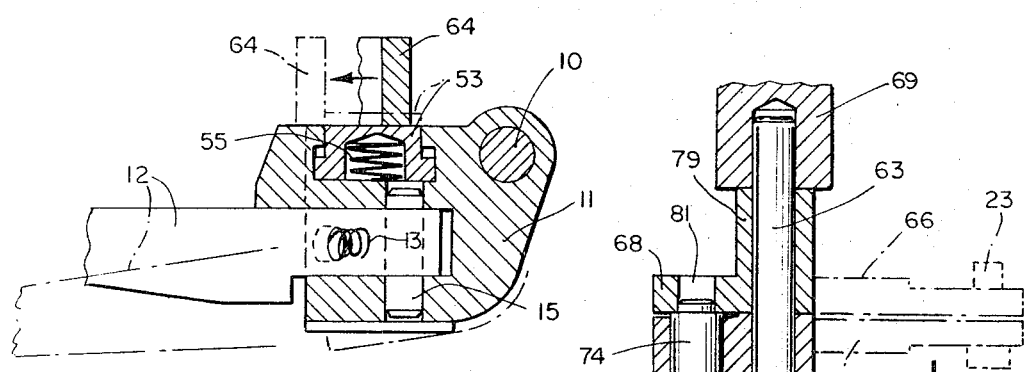
FIG. 6 is a view, in section, looking along the line of 6—6 of FIG. 5.
Figure 7:
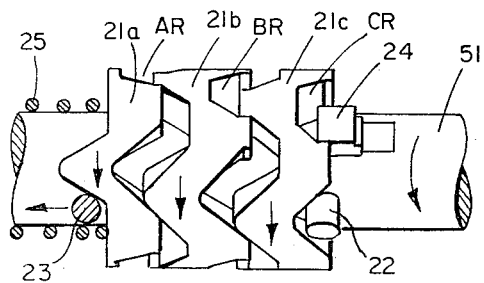
FIG. 7 is a view of the nose cam elements showing how they spread apart in response to the rotation of the handwheel shaft.

After rotation of the forward vertebrate cam element 21a has been stopped by the follower roller 23, as the handwheel shaft 51 and pin 22 continue to move rotationally, the middle and rearward elements 21b and 21c of the nest begin to move rotationally relative to each other, and also relative to the forward element 21a (FIG. 6). This causes spreading of the nested elements in the axial direction of shaft 51, thereby pushing follower roller 23 further forwardly. A key 24 which projects radially outwardly from shaft 51 into a shaped recess CR, moves rotationally with the shaft 51 within the recess CR until post 24 abuts against the edge of recess CR, as illustrated in FIG. 7. Thereafter, as shaft 51 continues to rotate, the element 21c is driven positively by the key 24, causing an increase in the relative movement between the rearward vertebrate cam element 21c and the middle vertebrate cam element 21b, thus pushing roller 23 still further forward. Vertebrate cam element 21c has a forwardly projecting lug which moves within recess BR of the middle element 21b until the lug abuts against the sidewall of the recess BR after which the middle element 21b is positively driven causing an increase in the relative movement between the middle and forward elements, and pushing cam roller 23 still further forwardly. In similar fashion, a projecting lug of the middle element 21b moves within a recess AR in the foremost element 21a until the lug abuts against the wall of the recess. The total result of the action described is to drive the cam follower roller 23 forwardly, in the direction indicated by the arrow in FIG. 7, through a greater distance than would otherwise be possible. It will be understood that, since cam follower roller 23 is mounted near the end of the lever arm 66 of the shifter cartridge 79 (FIGS. 1, 3 and 5) which is pivotal on a shaft 63, the forward movement of cam follower roller 23 is along an arcuate path.

When the cam follower roller 23 and lever arm 66 are driven forwardly along an arcuate path, as just described, a side portion 68 of shifter cartridge 79, which is integral with and which projects at right angles from arm 66, is caused to move similarly along an arcuate path. Side portion 68 of shifter cartridge 79 has a central vertical hole into the lower end of which (FIG. 5) projects the tip or terminal end of a vertical pin 71 which is spring-biased, as by spring 73, in the upward direction. An enlarged portion 74 of pin 71 bears against the underside of 68 at the edge of hole 81. Pin 71 is carried in a side portion 61 of a fork cartridge 60 which, like shifter cartridge 79, is pivotal on shaft 63.

Figure 4:
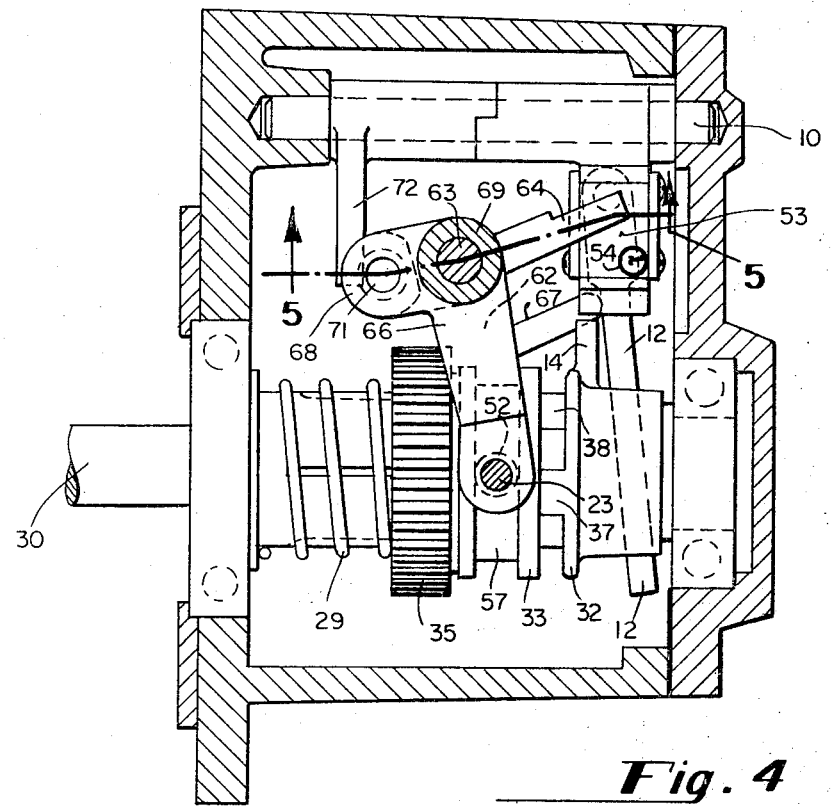
FIG. 4 is a view, partly in section, looking down along the line 4—4 of FIG. 2.

It will be seen, since pin 71 is projecting into hole 81, when roller 23 and shifter cartridge 79 are moved pivotally as just described, that pivotal movement of side portion 68 carries side portion 61 of the fork carriage 60 along with it, thereby causing fork cartridge 60, and the fork arms 62 which extend therefrom, to move pivotally on shaft 63. Projecting inwardly from the ends of fork arms 62 are disc rollers 52, which are received within the groove 57 of the sliding clutch 33. Thus, pivotal movement of the fork arms 62 on shaft 63, in the clockwise direction as viewed in FIG. 1, pulls the sliding clutch 33 forwardly, i.e., toward the left as seen in FIGS. 2 and 4. This pulls gear 35 forwardly, against the action of compression spring 29, and causes the teeth of gear 35 on the worm shaft to mesh with the teeth of gear 65 on the handwheel shaft 51.

When the fork cartridge 60 is moved pivotally clockwise on shaft 63 as just described, a latch lever 64 which projects rearwardly therefrom (FIGS. 1, 3, 4, 5 and 6) is also moved, from the solid line position shown in FIG. 6 to the phantom position. A latch 53 which is spring biased upwardly by spring 55, and which had been held down by the latch lever 64 when it was in the solid-line position, now moves upwardly to the phantom position shown in FIG. 6, thereby preventing the return of the latch lever 64. This has the effect, of course, of preventing the return of fork arms 62. Thus, the fork is now latched in a forward position wherein gear 35 is in mesh with gear 65.

Figure 5:
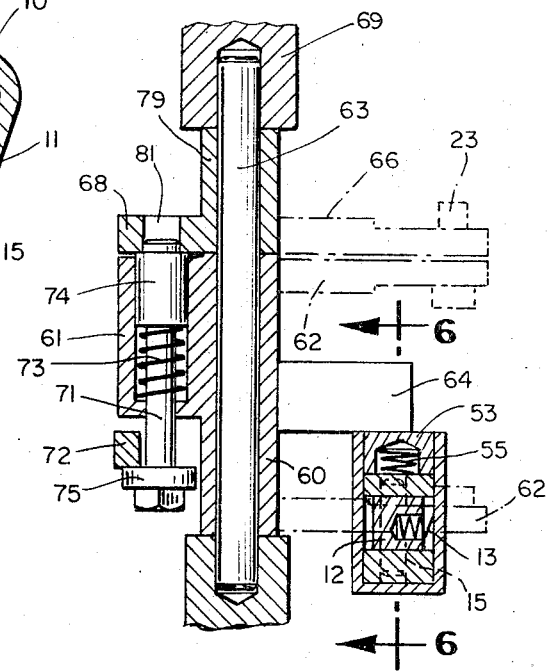
FIG. 5 is a view, in section, looking along the line of 5—5 of FIG. 4.

It will also be noted that when fork arms 62 are pivoted in a clockwise direction, as just described, a rearwardly projecting arm 67, which had held tripper lever 12 in a rearward position (FIG. 1) is moved forwardly thereby permitting the spring-biased tripper arm 12 to move pivotally forwardly on pin 15 under the action of the biasing spring 13 (FIGS. 5 and 6). This moves tripper arm 12 from its rearward position, illustrated in FIG. 4, to a forward position in which arm 12 is in a position to be engaged by a cam projection 14 on clutch element 32 when clutch element 32 is rotated. However, during manual handwheel drive, clutch element 32 is out of engagement with sliding clutch 33 and is stationary.

Continued rotational movement of handwheel shaft 51 beyond the point illustrated in FIG. 7 causes the follower roller 23 to be cammed to and over the tip of the nose of the forward vertebrate cam element 21a, and as soon as the tip of the nose of the element 21a has cleared the cam follower roller 23, the thrust of spring 25 upon the elements 21a, 21b and 21c causes the elements to spin back from their expanded condition shown in FIG. 7 to the contracted nested condition shown in FIGS. 1 and 2.

Continued rotation of the handwheel shaft 51 by the attendant, following forward shifting of the sliding clutch 33 by the fork arms 62 and meshing of the gears 35 and 65, causes rotation of clutch 33, sleeve 34, and worm shaft 36.

Manual rotation of the handwheel shaft 51 now continues without the nose of the most forward element 21a coming into engagement with cam follower roller 23 because the shifter cartridge 79 is now being held by pin 71 in the same angular position on shaft 63 as the fork cartridge 60 is being held by the latch lever 64 and latch 53. Thus, bias spring 47 is unable to move the shifter cartridge 79 counterclockwise on shaft 63, so long as pin 71 projects upwardly into hole 81 and so long as fork cartridge 60 is held in its forward latched position by latch 53.

SHIFT TO MOTOR DRIVE

Assume now that with gear 35 meshed with the handwheel drive gear 65, the motor power comes on. When this happens, the motor drive shaft 30 is driven rotationally clockwise, and since clutch element 32 is keyed to shaft 30, the clutch element 32 is driven rotationally. When clutch element 32 rotates, the projecting cam portion 14 (FIGS. 1, 3 and 4) comes into engagement with, and cams downwardly, the tripper lever 12 which, as previously described, is in its spring-biased forward position.

Figure 3:
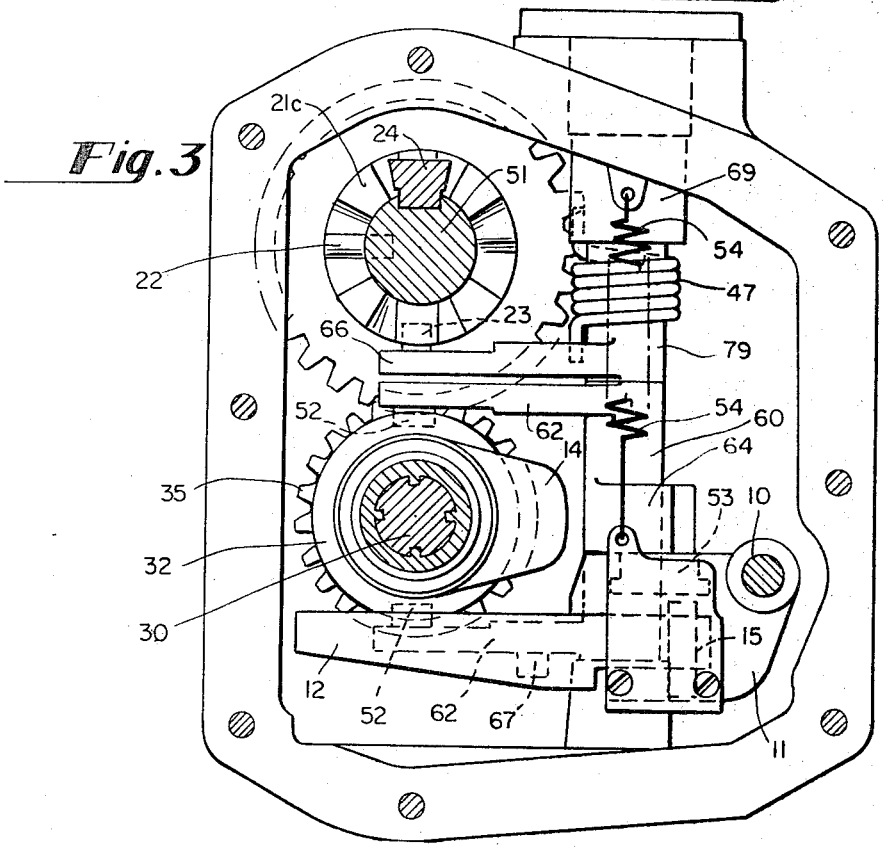
FIG. 3 is an end elevational view looking along the line 3—3 of FIG. 2.

This moves tripper lever 12 downwardly and moves latch cartridge 11 in a counterclock direction on shaft 10 as viewed in FIGS. 3 and 6. This moves these elements from the solid-line to the phantom positions in FIG. 6. This pulls down the latch 53 and unlatches latch lever 64, allowing bias spring 29 to move fork cartridge 60 in a counterclockwise direction about shaft 63, as seen looking down in FIGS. 1 and 4.

This movement is a result of the thrust of the heavy compression spring 29 on the sliding clutch 33 which urges clutch 33 to the right (FIGS. 1, 2, 4), thereby urging the fork arms 62 in a counterclockwise direction. Before tripper lever 12 is cammed downwardly, the latch lever 64, and hence the fork cartridge 60, is prevented from moving counterclockwise by the latch 53.

When, as just described, the tripper lever 12 is "tripped", i.e., moved momentarily downward by cam 14, the latch lever 64 is unlatched and immediately moves from the phantom to the solid-line position in FIG. 6. As soon as cam 14 clears the tripper lever 12, lever 12 moves up and latch cartridge 11 moves clockwise about shaft 10 in response to the pull of spring 54 (FIGS. 1, 3). The spring biased latch 53 is, however, prevented from returning upwardly to the phantom position seen in FIG. 6, due to the presence of latch lever 64, which is now in the solid-line position.

When, as has been described, the latch lever 64 is unlatched, thereby allowing fork cartridge 60 and fork arms 62 to move pivotally counterclockwise, as viewed looking down in FIG. 1, the rearwardly projecting arm 67 pushes the tripper lever 12 pivotally about pin 15 rearwardly into a position where it is out of the rotational path of the cam 14. Thus, the motor drive shaft 30 may thereafter continue to drive clutch element 32 without cam 14 engaging the lever 12.

When, as described, gear 35 and sliding clutch 33 are shifted to the right by spring 29, the lugs 38 of the sliding clutch 33 are engaged by the lugs 37 of the motor-driven clutch element 32, and since the sliding clutch 33 is splined to sleeve 34, which in turn is splined to worm shaft 36, the worm shaft 36 is in this manner driven by the motor shaft 30.

Assume now when the power came on to drive the motor and motor shaft 30, that the handwheel shaft 51 has been left in such a position that the nose of the forward cam element 21a is in axial alignment with the cam follower roller 23 thereby preventing cam follower roller 23 and shifter arm 66 from moving from left to right, as viewed in FIGS. 1 and 4. Unless provision is made for this possibility, the inability of follower roller 23 and shifter arm 66 to move in the direction indicated would also prevent fork 62 from moving from left to right. To avoid this situation, the present invention provides a secondary latch for uncoupling fork arms 62 from the shifter arm 66. It has been described how tripper lever 12 is cammed downwardly by cam 14 when the clutch element 32 is driven rotationally by motor shaft 30 and that this pulls the latch cartridge 11 pivotally counterclockwise about shaft 10. Latch cartridge 11 is shown to be formed in two pieces but this is merely for assembly reasons. So far as operation is concerned, latch cartridge 11 could be all one piece. Projecting from the forward portion of latch cartridge 11 is a clutch-release arm 72 (FIGS. 1 and 5) which extends across the upper surface of the head 75 of pin 71. Thus, when cam 14 cams the tripper lever 12 momentarily downwardly, thereby rotating latch cartridge 11 counterclockwise on shaft 10, the arm 72 puches pin 71 momentarily downwardly, thereby allowing the fork arms 62 and fork cartridge 60 to move pivotally counterclockwise on shaft 63 independently of the shifter arm 66 and shifter cartridge 79. Biasing spring 47 urges shifter cartridge 79 in the counterclockwise direction, as viewed looking down in FIG. 1, and, unless prevented from so moving by nose cam 21a, the shifter arm 66 will move the cam follower roller 23 in the same direction as fork arms 62 are moving during the shift to motor drive.

What is claimed is:

1. A valve operator having:
   a. a main drive shaft (36);
   b. a motor drive shaft (30);
   c. coupling means (32, 33, 34) including a sliding clutch member (33) for coupling said motor drive shaft to said main drive shaft according to the position of said sliding clutch member;
   d. a manual drive shaft (51);
   e. coupling means (65, 35, 33, 34) including said sliding clutch member (33) for coupling said manual drive shaft to said main drive shaft according to the position of said sliding clutch member;
   f. spring means (29) normally biasing said sliding clutch member (33) to couple said motor drive shaft to said main drive shaft;
   g. a clutch fork cartridge (60) pivotally mounted on a fixed support shaft (63) and having fork arms (62) engaging said sliding clutch member (33) for shifting said sliding clutch member from motor drive to manual drive positions;
   h. a shifter cartridge (79) pivotally mounted on said fixed support shaft (63) and having a lever arm (66) having thereon a cam follower roller (23);
   i. vertebrate cam means (21a, 21b, 21c) on said manual drive shaft for engaging said cam follower roller (23) for moving said shifter cartridge pivotally on said fixed support shaft;
   j. secondary latch means (71) coupling together said shifter cartridge and clutch fork cartridge whereby when said secondary latch is engaged pivotal movement of said shifter cartridge by said cam means causes said clutch fork cartridge and said shifter cartridge to move pivotally together on said fixed support shaft in a direction to shift said sliding clutch member (33) out of motor drive and into manual drive position;

k. latch means (53, 64) for holding said clutch fork cartridge in manual drive position after shifting of said sliding clutch into manual drive position;

l. and tripper means (14, 12, 11) actuated by rotation said motor drive shaft for unlatching said latch means (53, 64) and disengaging said secondary latch means (71) to allow said spring biasing means (29) to shift said sliding clutch (33) out of manual drive position and into motor drive position independently of said shifter cartridge.

2. Apparatus according to claim 1 wherein said secondary latch means includes a recess (81) carried by said shifter cartridge and a pin (71) carried by said fork cartridge spring biased in a direction to cause an end portion of said pin to enter said recess in said shifter cartridge.

3. Apparatus according to claim 2 wherein said tripper means includes lever means (72) for withdrawing said pin (71) from said recess (81) when said tripper means is actuated.

4. Apparatus according to claim 1 wherein said shifter cartridge is spring biased (47) in a direction to urge said cam follower roller (23) toward said cam means on said manual drive shaft.

5. Apparatus according to claim 1 wherein said cam means on said manual drive shaft comprises a plurality of annular cam elements, said cam elements having forwardly projecting vertebrate cam means and rearward recess means for receiving said vertebrate cam means of an adjacent annular cam element, said annular members being adapted to nest with each other when said vertebrate cams are in axial alignment.

6. Apparatus according to claim 5 wherein at least some of said annular vertebrate cam elements include forwardly projecting drive lugs and other of said cam elements have lug recesses for receiving said drive lugs.

7. Apparatus according to claim 6 wherein said manual drive shaft includes a drive pin for engaging one of said annular vertebrate cam elements for driving said element rotationally and axially.

* * * * *